June 21, 1927. 1,632,852

J. W. RICHTER

FEEDING DEVICE

Filed Feb. 9, 1924 3 Sheets-Sheet 1

Inventor
John W. Richter
by H. A. Patton Atty.

June 21, 1927.
J. W. RICHTER
1,632,852
FEEDING DEVICE
Filed Feb. 9, 1924
3 Sheets-Sheet 2
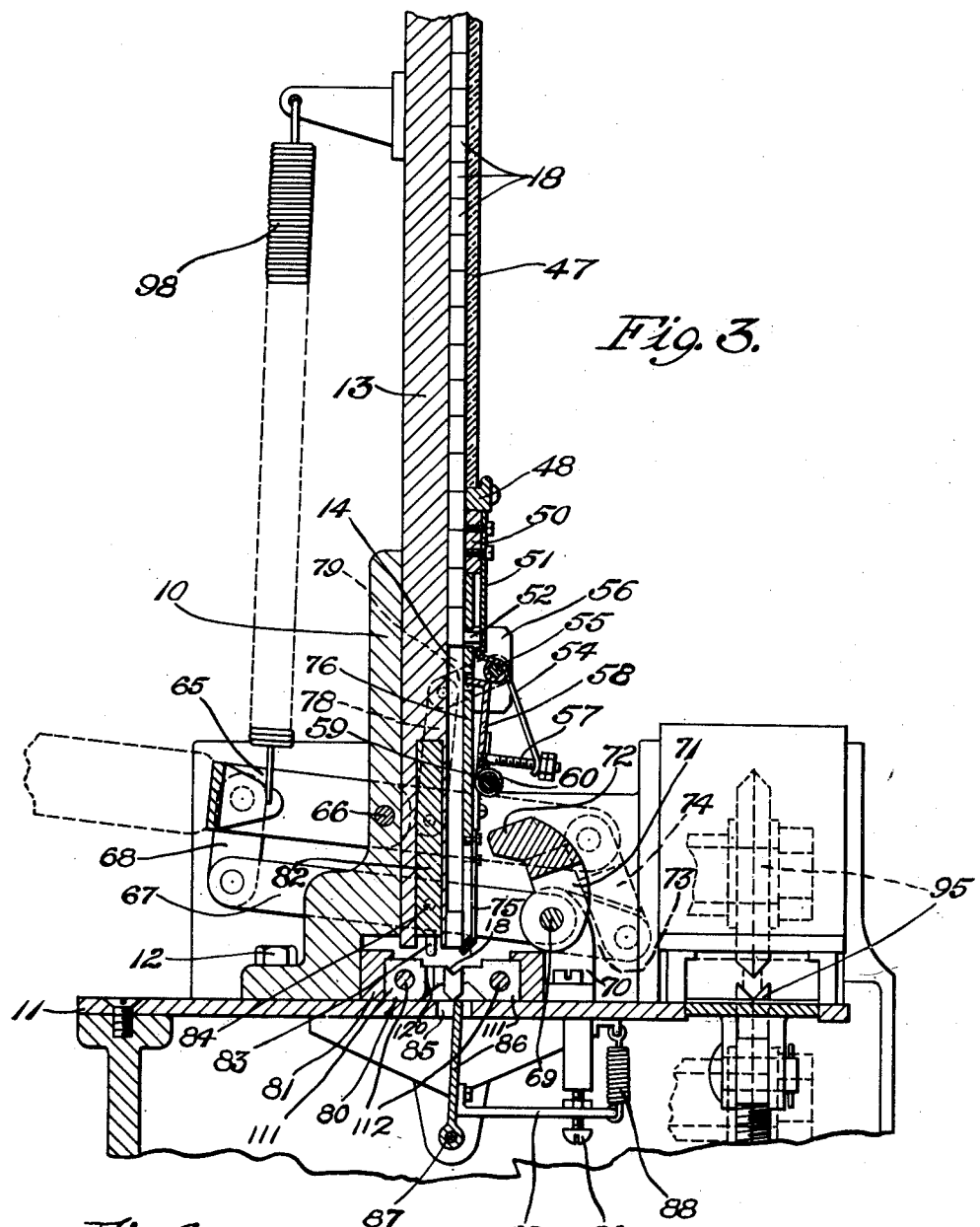
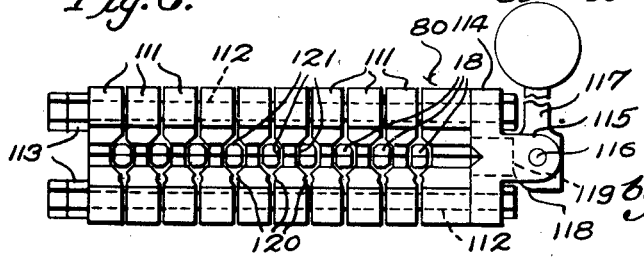
Inventor
John W. Richter
by H. A. Pattison
Atty.

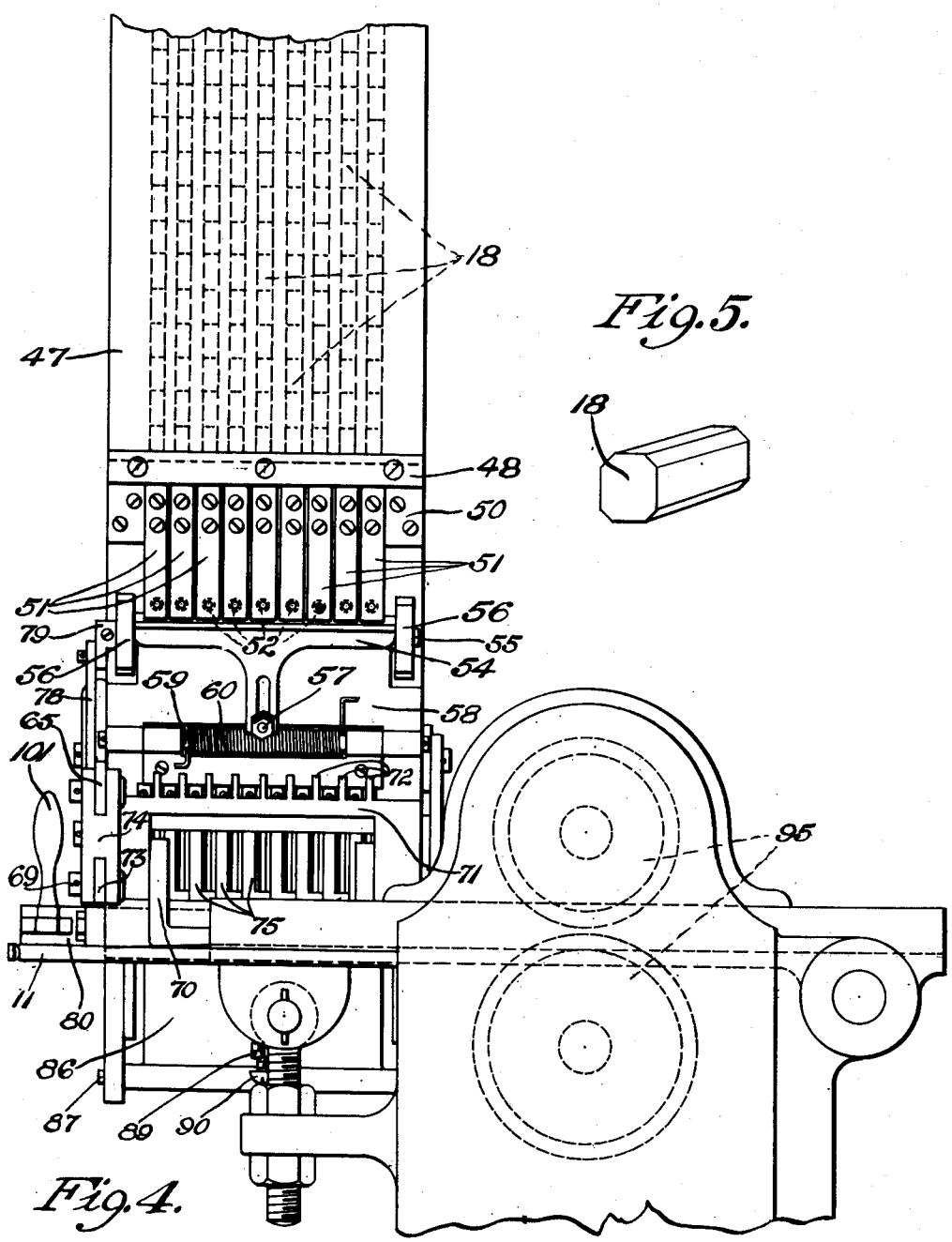

Patented June 21, 1927.

1,632,852

UNITED STATES PATENT OFFICE.

JOHN WILLIAM RICHTER, OF CHICAGO, ILLINOIS, ASSIGNOR TO WESTERN ELECTRIC COMPANY, INCORPORATED, OF NEW YORK, N. Y., A CORPORATION OF NEW YORK.

FEEDING DEVICE.

Application filed February 9, 1924. Serial No. 691,862.

This invention relates to feeding devices and more particularly to a mechanism for stacking and feeding small articles or blanks.

An object of this invention is to automatically stack small articles in columns from which they may be rapidly inserted into a holder or tool for the purpose of having some work performed thereon.

Another object of this invention is to transfer blanks from a receptacle into a holder for the purpose of having work performed thereon and to automatically eject worked articles from the holder.

Another object of this invention is to provide a feeding mechanism which is comparatively simple in all of its parts, exceedingly simple in operation and which is capable of being operated at a high rate of speed.

A still further object of this invention is to provide a feeding device which occupies a relatively small amount of floor space and which may be readily and rapidly operated by a single operator.

Additional objects of this invention are to properly position a holder to receive an article transferred thereto from a feeding device and to position the holder in a machine which performs work upon the article.

Other objects and advantages of the present invention will more fully appear in the following description and will be particularly pointed out in the appended claims.

In accordance with the general features and objects of this invention, there is provided a hopper which is kept filled to a suitable height with the articles to be fed. One side of the hopper is provided with a plurality of grooves, each of which leads to a vertical feedway or chute. Means comprising a plurality of revolving cam-like agitators are provided for properly seating and stacking the articles in the feedways. An automatic stop mechanism is provided for closing the passage at the top of each feedway so as to prevent the articles being stacked above a certain predetermined point which would interfere with the operation of the agitators. Mechanism is provided for simultaneously releasing and feeding the article at the bottom of each feedway into a holder positioned thereunder, while the remaining articles in each stack are held in position and prevented from dropping. Upon the completion of the desired work on said articles they are ejected from said holder by the insertion of unworked articles or blanks. Means is also provided for properly positioning the holder to receive articles from the feedways and a guide is provided to position the holder in a machine for performing work upon the articles.

One embodiment of the invention is illustrated in the accompanying drawings in which, Fig. 1 is a vertical section through the upper part of the machine, showing the hopper and mechanism for arranging the blanks in vertical feedways.

Fig. 3 is a vertical section through the lower part of the machine, taken on the same plane as Fig. 1.

Fig. 4 is a front elevation of the mechanism shown in Fig. 3.

Fig. 5 is an enlarged perspective view of a blank suitable for use in a machine shown in Figs. 1 to 4 inclusive, and Fig. 6 is a detail plan view of the blank holder showing its clamping sections separated from each other.

Figures 1, 2:
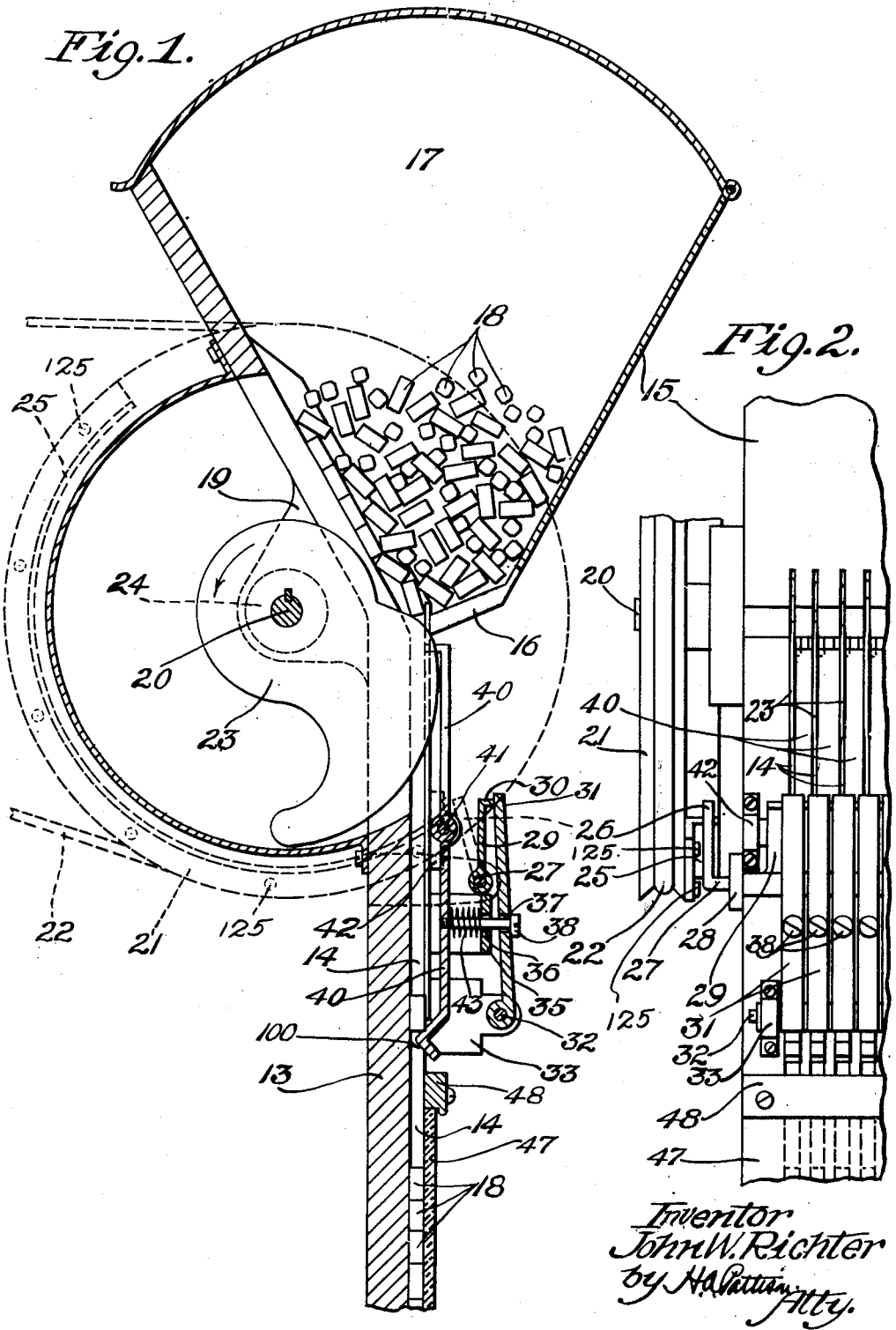
Fig. 2 is a fragmentary front elevation of the mechanism shown in Fig. 1.

The invention is illustrated in connection with a machine for milling lamp bases but it will be understood that the general features of this invention may be adapted for use in connection with widely differing machines.

The main support of the machine comprises an upright member 10 which is suitably secured to the top of a table or bench 11 by bolts 12. Rigidly secured to the support member 10 or formed integral therewith is a vertical back member 13, in one side of which are a plurality of vertical grooves or feedways 14. The upper part of member 13 slopes back at an angle and a metal plate 15 fastened to a bottom piece 16, together with side plates 17, form a hopper for holding a supply of blanks 18. Bearing lugs 19 formed at each end of vertical member 13 support a shaft 20 to which is keyed a pulley 21 which may be driven by a belt 22 from any suitable source of power (not shown).

The shaft 20 has also keyed thereto, one opposite the center of each feedway, agitator blades 23 with spacers 24 between them. The pulley 21 has a cam 25 of an angular cross section fastened on its inner face by screws 125, which cam extends about half way around, the function of which will hereinafter be described.

An arm 26 is integral with a shaft 27 carried in bearings 28 mounted on either side of the vertical member 13 in such a position that the upper part of arm 26 is engaged by the periphery of the cam 25 as the pulley 21 is revolved. A plate 29 is keyed to the shaft 27 and extends completely across the face of the machine; the upper edge of this plate is lapped over to form a forwardly projecting portion 30, which normally rests against the upper portions of a plurality of levers 31 on a shaft 32 carried by brackets 33 secured to the vertical member 13, one on each side thereof. A bridge-like cross member 35 is fastened to upright 13 at each end thereof and is provided with a plurality of holes 36 which are in alignment with holes or openings 37 drilled in the levers 31. Bolts 38 are inserted through the openings 36 and 37 and are rigidly secured to a plurality of levers 40, which are pivoted near their centers on a shaft 41 carried by supporting brackets 42. Compression springs 43 encircling the bolts 38 between the levers 40 and the inner wall of the bridge member 35 tend to keep the lower ends of levers 40 in the vertical grooves or feedways 14. A glass plate 47 is held in place on the front of the machine by retaining members 48. At the foot of the glass plate 47 is a cross member 50 to which are secured, one opposite each feedway, flat springs 51, each of which carries, at its lower end, a stud 52. The tension of the spring 51 causes the studs 52 to tend to enter the feedways and normally press against the blanks which are in the feedways at that point, with sufficient force to hold them from slipping by. Hooked under the lower end of each of these springs, and extending the full width of the machine is a cross member 54, which is rigidly secured to a shaft 55 carried by supporting brackets 56 mounted on the upright 13. The lower end of the cross member 54 is bifurcated at about the middle thereof, to form a yoke which permits a bolt 57 to ride therein. The bolt 57 is rigidly secured to a flat cross piece 58 which is hinged on a rod 59 and is subject to the pressure of a coil spring 60 encircling said rod, which tends to force its upper end toward the upright member 13.

A hand lever 65 is pivoted on a pin 66 secured to support member 10 and a second lever 67, which is connected to lever 65 by a link 68, is pivoted on a shaft 69 supported by brackets 70. Also pivoted on the shaft 69 is a feeding member 71, which has, opposite each feedway, a finger 72 designed to enter the feedway 14 when the member 71 is rotated in a counter clock-wise direction. Rigidly secured to or formed integral with the feeding member 71 is a link 73 which is connected to the end of lever 65 by a second link 74 to form a knuckle joint.

A plurality of leaf springs 75 are secured, one opposite each feedway, to a cross front piece 76. The lower ends of these springs are bent inwardly slightly so that they project into the feedways far enough to prevent blanks 18 from slipping down by force of gravity. One end of a link 78 is pivoted to the lever 65 intermediate its pivot point 66 and the end thereof, while the other end of said link is pivoted to a second link 79, which is keyed to or formed integral with the shaft 55. A blank holder 80 (Fig. 6) is suitably held in position as by clamping members 81 secured to the top of the bench. The holder 80 comprises a plurality of clamping sections 111 loosely mounted side by side on a pair of parallel rods 112. Threaded at one end of the rods 112 are adjusting screws 113 and carried at opposite ends thereof is a member 114 having a bifurcated portion 115 within which is mounted a pin 116. Pivoted on the pin 116 is a lever 117 having a cam surface 118 which engages the end of a lug 119 formed integral with the section 111 adjacent to the member 114. The adjoining surfaces of the sections 111 are provided with grooves which cooperate to form openings 120 and 121 between the adjacent sections 111. The blanks 18 are inserted in the openings 121 formed between each of the sections 111 and are firmly clamped therein by turning the lever 117 in a clockwise direction which causes the member 114 to move to the left, as viewed in Fig. 6, causing the sections 111 to move towards each other. A reciprocating member 82, carrying spreader pins 83, is pivoted at 84 to lever 67 and at each depression of the hand lever 65, forces the spreader pins in the openings 120 between adjacent parts 111 of the holder 80 to separate them and thus facilitate the ejection of milled articles and the insertion of fresh blanks.

The top of the bench is provided with an opening 85 to permit the milled articles to drop through into any suitable container (not shown). A stop 86 is pivoted at 87 and is held in position by a spring 88 and a lever 89, which may be properly adjusted by a set screw 90.

The holder 80 and milling cutters shown generally at 95 are of a well known type and form no part of this invention.

The operation of the machine constructed as described is as follows:—A supply of blanks are deposited in the hopper and the pulley 21 is set into motion through any suitable source of power (not shown). The agitator blades 23 being keyed to the same shaft as pulley 21, are caused to pass in and out of the feed grooves to agitate the mass of blanks, allowing properly seated ones to drop down the feedways and ejecting improperly seated ones. On each revolution of the pulley, cam 25 strikes arm 26 moving it to the right as viewed in Fig. 1 causing the member 29, which is keyed to the shaft 27, to likewise move to the right to push the upper ends of levers 31 outwardly thereby lifting the lower ends of levers 40 out of the feedways to permit any blanks which are caught thereon to drop down. At the same time the upper bent portion of levers 40 are forced into the feedways so as to temporarily stop the blanks from dropping down the feedways which would interfere with the operation of said levers. When a feedway is fully supplied up to a point 100 (Fig. 1), the upper bent portion of lever 40 will be held in the feedway until the supply once more drops to release said lever. This is to prevent the feedways from filling up to a point which would interfere with the operation of the agitator blades. The mechanism above described is all actuated by pulley 21 as is clearly illustrated in Figs. 1 and 2.

Referring now to Fig. 3, the stud 52 on spring 51 normally presses against the lowest blank in the column with sufficient pressure to prevent any from dropping. Upon depression of the hand lever 65, link 78, being pivoted to said hand lever to the right of the pivot point thereof, moves upward and through link 79, causes the yoke end of member 54 to move in, and the upper end thereof to move out. This causes member 58 to swing into the feedway and at the same time releases the stud 52, allowing the blank to drop down and rest on said member. At the same time by the operation of the knuckle joint above described, blank 18, at the lowermost position in the feed chute, is forced down into the holder by feed member 71, driving the previously milled article ahead of it through the opening 85. The stop member 86 is forced aside by the wedge shaped article so as to allow it to pass after which the spring 88 restores said stop to its normal position to prevent the passage of the flat bottom blanks.

Upon the release of the lever 65, a spring 98 restores it to normal position and the member 58 is drawn out of the feedway allowing the blank, which was released by the down stroke of the lever to drop to the bottom of the feedway; at the same time the stud 52 is pressed on the next blank above to prevent it from dropping. The holder 80 is then manually withdrawn by means of a handle 101 attached to it, inserted in the miller 95 and then returned to be reloaded.

From the foregoing it will be seen that a machine embodying the features of this invention is exceedingly simple in all its parts, semi-automatic in its operation, and may be readily and rapidly operated by a single operator.

While there is herein shown and described one specific embodiment of this invention, yet it will be obvious that the details thereof may be modified to some extent without departing from the general scope of the invention which should be limited only by the scope of the appended claims.

What is claimed is:

1. An article feeding mechanism comprising a receptacle having a feed groove therein for receiving properly positioned articles contained in said receptacle, a feedway communicating with said feed groove, an agitator including a rotating cam blade passing in and out of said feed groove for removing improperly positioned articles therefrom and engaging properly positioned articles in said feed groove to thereby facilitate the passage of properly positioned articles into said feedway, and means actuating in response to the position of the uppermost article in said feedway for controlling the passage of additional articles therein.

2. An article feeding mechanism comprising a receptacle having a feed groove therein for receiving properly positioned articles contained in said receptacle, a feedway communicating with said feed groove, an agitator passing in and out of said feed groove for removing improperly positioned articles therefrom to facilitate the passage of properly positioned articles into said feedway, a pivoted member movable in and out of said feedway and actuating in response to the position of the uppermost article therein for controlling the passage of additional articles, and common means for simultaneously operating the agitator and said pivoted member.

3. An article feeding mechanism comprising a receptacle having a feed groove therein for receiving properly positioned articles contained in said receptacle, a feedway communicating with said feed groove, an agitator passing in and out of said feed groove for removing improperly positioned articles therefrom to facilitate the passage of properly positioned articles into said feedway, a holder for receiving articles, one at a time, from said feedway, and means for removing an article from said feedway forcing the removed article against an article in said holder and thereby simultaneously ejecting the previously inserted article from the holder and inserting therein the article removed from said feedway.

4. An article feeding mechanism comprising a receptacle, a feedway connected therewith, means for passing properly seated articles from said receptacle into said feedway, means for feeding said articles from said feedway into a holder so that work may be performed thereon, and means controlled by the condition of the articles in said holder for controlling the passage of said articles therethrough.

5. An article feeding mechanism comprising a receptacle, a feedway connected therewith, means for passing properly seated articles from said receptacle into said feedway, means for feeding said articles from said feedway into a holder so that work may be performed thereon, and means for passing worked articles through said holder and preventing the passage of unworked articles therethrough.

6. An article feeding mechanism comprising a receptacle, a plurality of feedways connected therewith, means for passing properly seated articles from said receptacle into said feedways, means for feeding said articles from said feedways into a holder so that work may be performed thereon, and a resiliently mounted stop member associated with said holder to permit the passage therethrough of worked articles and prevent the passage of unworked articles.

In witness whereof, I hereunto subscribe my name this 30 day of January A. D., 1924.

JOHN WILLIAM RICHTER.